United States Patent
Liu

(10) Patent No.: US 7,894,813 B2
(45) Date of Patent: *Feb. 22, 2011

(54) METHOD AND APPARATUS FOR UTILIZING HISTORICAL NETWORK INFORMATION FOR MITIGATING EXCESSIVE NETWORK UPDATES WHEN SELECTING A COMMUNICATIONS CHANNEL

(75) Inventor: Xin Liu, Waterloo (CA)

(73) Assignee: Research In Motion Limited, Waterloo (CA)

( * ) Notice: Subject to any disclaimer, the term of this patent is extended or adjusted under 35 U.S.C. 154(b) by 403 days.

This patent is subject to a terminal disclaimer.

(21) Appl. No.: 12/021,883

(22) Filed: Jan. 29, 2008

(65) Prior Publication Data
US 2008/0125121 A1 May 29, 2008

Related U.S. Application Data

(63) Continuation of application No. 10/928,006, filed on Aug. 27, 2004, now Pat. No. 7,333,811.

(51) Int. Cl.
*H04W 4/00* (2009.01)
*H04W 36/00* (2009.01)
(52) U.S. Cl. ............... 455/435.1; 455/436; 455/437; 455/439; 455/444
(58) Field of Classification Search ......... 455/436–444, 455/435.1
See application file for complete search history.

(56) References Cited

U.S. PATENT DOCUMENTS

| | | | |
|---|---|---|---|
| 5,822,696 A | 10/1998 | Bergkvist | |
| 7,333,811 B2 * | 2/2008 | Liu | .............. 455/435.1 |
| 2002/0102977 A1 | 8/2002 | Shi | |

FOREIGN PATENT DOCUMENTS

EP    1 229 754 A1    8/2002

OTHER PUBLICATIONS

European Search Report Application No. 04255192.9; European Patent Office; 2 pages.

\* cited by examiner

*Primary Examiner*—Jinsong Hu
*Assistant Examiner*—Marisol Figueroa
(74) *Attorney, Agent, or Firm*—The Danamraj Law Group, P.C.

(57) ABSTRACT

A method and apparatus for selecting a base transceiver station from a plurality of available base transceiver stations. The method comprises identifying an incremental value associated with an adjacent base transceiver station; selecting, from a plurality of available margin values, a selected margin value according to the incremental value associated with the adjacent base transceiver station; acquiring, from the adjacent base transceiver station, an adjacent signal having an adjacent signal level; acquiring, from the serving base transceiver station, a reference signal having a reference signal level; and selecting a communications channel with the adjacent base transceiver station and incrementing the incremental value whenever the adjacent signal level exceeds the reference signal level plus the selected margin value.

15 Claims, 1 Drawing Sheet

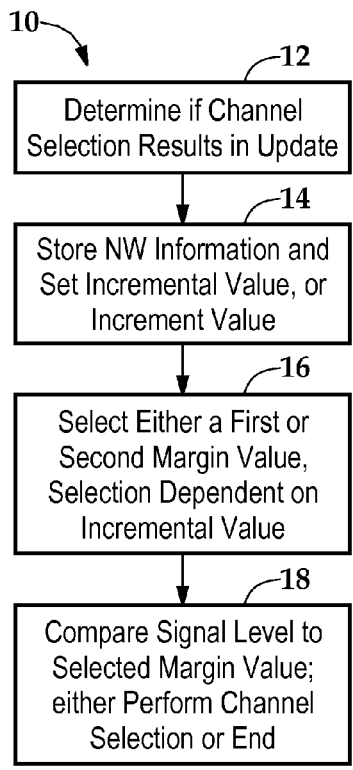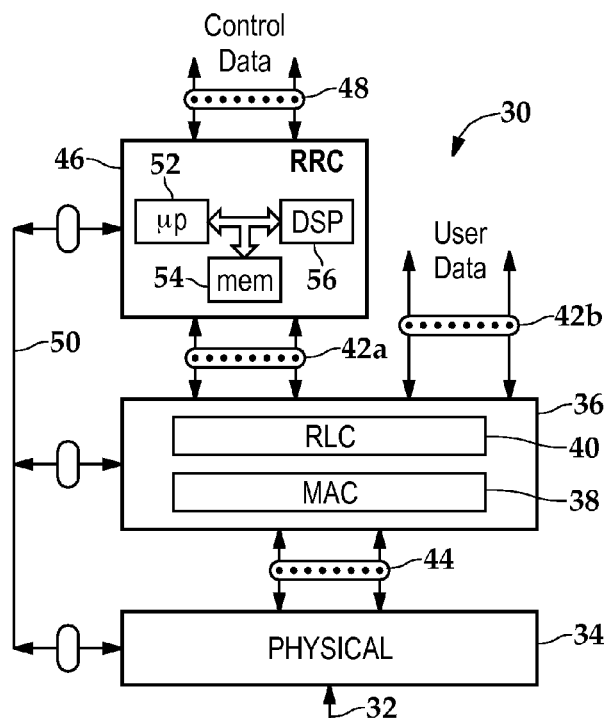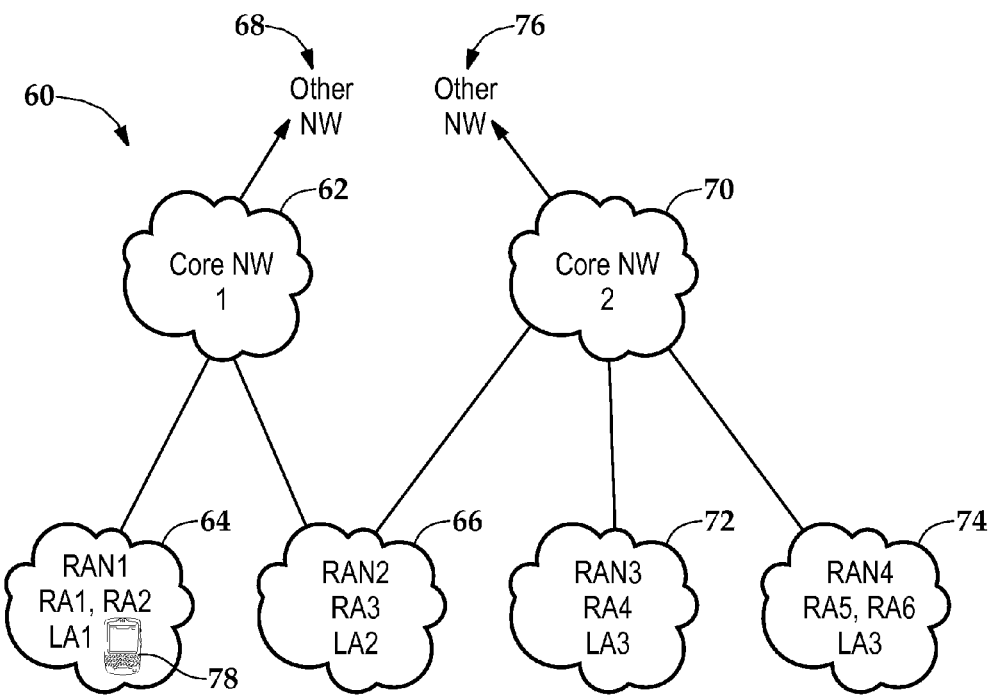

METHOD AND APPARATUS FOR UTILIZING HISTORICAL NETWORK INFORMATION FOR MITIGATING EXCESSIVE NETWORK UPDATES WHEN SELECTING A COMMUNICATIONS CHANNEL

CROSS-REFERENCE TO RELATED APPLICATIONS

This is a continuation of U.S. patent application Ser. No. 10/928,006, filed Aug. 27, 2004.

TECHNICAL FIELD OF THE INVENTION

The present invention relates, in general, to the field of Radio Resource Control (RRC) mechanisms in wireless communication networks, and, in particular, to a method and apparatus for selecting a communications channel.

BACKGROUND

In wireless communication networks, for example a Universal Mobile Telecommunications System (UMTS), communication channels may be created between: a mobile communications device for providing access to network services over radio communications channels; a Radio Access Network (RAN) comprising at least one radio base transceiver station for sending and receiving information over the communication channels and at least one radio network controller for controlling which communication channel over which radio base transceiver station a mobile communications device communicates and for routing the communications traffic; a core network comprising network nodes for providing network control features, such as billing and authentication, and routing communications traffic to and from the appropriate RAN and to and from other networks; and other networks, such as either a Public Switched Telephone Network (PSTN) or a Packet Data Network (PDN), for routing communications traffic to and from the core network. A mobile communications device may transition between base transceiver stations supported by the same radio network controller according to signal strength measurements received from each radio base transceiver station. A transition between radio base transceiver stations supported by the same radio network controller and further supported by the same core network only requires a radio interface update, and an interface update between the RNC and base transceiver station. However, a transition between radio network controllers supported by different core network requires a radio interface update, an interface update between the RNC and the base transceiver station, an interface update between the RNC and the core network; and a transition between core networks requires the additional interface update between the core network and either the PSTN or PDN.

When a mobile communications device transitions between RNC, the update is referred to a Routing Area Update (RAU). When a mobile communications device transitions between core networks, the update is referred to as a Location Area Update (LAU). The RAU and LAU require a much greater volume of signaling over the radio link than the interface update required when the mobile communications device transitions between base transceiver stations supported by the same radio network controller. Therefore, considering the limited resources and sensitive nature of the radio link, the interface updates required when transitioning between RNC and the core networks should be well controlled so as to prevent unnecessary power consumption and signaling over the radio interface. Because this occurs when the mobile communications device transitions between base transceiver stations supported by different RAN or core network, there is a potential the position of the mobile communications device and radio link conditions may result in frequent and unnecessary updates. This uncontrolled frequency can cause excess power consumption from the mobile communications device and excess traffic over the radio interface.

In order to mitigate excessive LAU and RAU, standard specification 3GPP 05.08 requires that a signal level from a serving base transceiver station compared against a signal level from an adjacent base transceiver station should be adjusted by a predetermined margin value in the case of a LAU or RAU. Adjusting the reference signal may in some circumstances prevent unnecessary updates from occurring, and, therefore, help reduce power consumption and improve radio link efficiency. For example, adjusting the reference signal may help prevent a mobile communications device positioned within an area in the network between two network cells served by two different radio base transceiver stations under certain propagation characteristics from unnecessarily switching between the two cells. However, due to the sensitivity of radio channels and therefore the unpredictable nature of radio channels, the same position at a different time may be under different propagation characteristics, or another position defined by different propagation characteristics, may not respond as well to the same adjusted value. Therefore, there is a need to provide an improved method and of adjusting the reference signal level in order to mitigate excessive network updates.

SUMMARY

To overcome the limitations identified within the background, a method and apparatus are provided for selecting a communications channel. In one embodiment, the present disclosure provides a method for selecting a base transceiver station from a plurality of available base transceiver stations. The method comprises identifying an incremental value associated with an adjacent base transceiver station; selecting, from a plurality of available margin values, a selected margin value according to the incremental value associated with the adjacent base transceiver station; acquiring, from the adjacent base transceiver station, an adjacent signal having an adjacent signal level; acquiring, from the serving base transceiver station, a reference signal having a reference signal level; and selecting a communications channel with the adjacent base transceiver station and incrementing the incremental value whenever the adjacent signal level exceeds the reference signal level plus the selected margin value.

According to a second embodiment, the present disclosure relates to a mobile communications device comprising a memory and a processor. The memory is operable to store network identification information and associated incremental values. The processor is operable to identify an incremental value associated with an adjacent base transceiver station; select, from a plurality of available margin values, a selected margin value according to the incremental value associated with the adjacent base transceiver station; acquire, from the adjacent base transceiver station, an adjacent signal having an adjacent signal level; acquire, from a serving base transceiver station, a reference signal having a reference signal level; and select a communications channel with the adjacent base transceiver station and increment the incremental value whenever the value of the adjacent signal level exceeds the sum of the reference signal level and the selected margin value.

According to a third embodiment, the present disclosure relates to a mobile communications device comprising means for identifying an incremental value associated with an adjacent base transceiver station; means for selecting, from a plurality of available margin values, a selected margin value according to the incremental value associated with the adjacent base transceiver station; means for acquiring, from the adjacent base transceiver station, an adjacent signal having an adjacent signal level; means for acquiring, from the serving base transceiver station, a reference signal having a reference signal level; and means for selecting a communications channel with the adjacent base transceiver station and incrementing the incremental value whenever the adjacent signal level exceeds the reference signal level plus the selected margin value.

BRIEF DESCRIPTION OF THE DRAWINGS

FIG. 1 illustrates procedural steps identifying a method of mitigating excessive network update utilized within a channel selection mechanism of a mobile communications device;

FIG. 2 illustrates relevant UMTS architecture of a mobile communications device utilizing the channel selection mechanism; and FIG. 3 illustrates a wireless communications network, for example a UMTS communications network, supporting communication services for a communications device utilizing the channel selection mechanism.

DETAILED DESCRIPTION

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention. A channel selection mechanism of a communications device utilizing channel selection history in order to mitigate excessive network updates is presented. The communications device receives information over communication channels including network identification information and signal having signal strength from the adjacent base transceiver stations and compares the received signal strength against the signal strength of the serving base transceiver station. The channel selection mechanism is able to obtain from the information and the signal strength whether or not a Routing Area Update (RAU) or Location Area Update (LAU) is required. If either update is required, the network information associated with either or both, depending on the update required, the RAU or LAU is stored and either an incremental value is set or incremented depending on whether an update occurred previously. Depending on the value of the incremental value, the channel selection mechanism compares the signal strength against the signal strength of the serving base transceiver station plus either a first margin value or a second margin value in order to determine channel selection.

Referring to FIG. 1, procedural steps identifying a method of mitigating excessive network update utilized within a channel selection mechanism of a mobile communications device is illustrated and denoted generally as 10. At block 12, the channel selection mechanism receives information including network identification identifying location and routing areas and signals having signal level indicating signal strength from a base transceiver station adjacent to a serving base transceiver station providing communications service to the mobile communications device. The channel selection mechanism determines if the signal level received from the adjacent base transceiver station meets or exceeds the signal level, referred to herein as the reference signal level, of the serving base transceiver station. If the signal level does not meet or exceed the reference signal level, the channel selection procedure is terminated. If the signal level meets or exceeds the signal level of the serving base transceiver station, the channel selection mechanism determines from the network information if selecting the channel of the adjacent base transceiver station would result in a Location Area Update (LAU) or Routing Area Update (RAU). If channel selection would not result in a LAU or RAU, channel selection is performed. At block 14, if channel selection would result in a LAU or RAU, the channel selection mechanism determines if selection between either the same two areas occurred previously. If selection between either of the same two areas did not occur previously, channel selection mechanism stores the network identification information and sets an incremental value. If selection between either the same two areas occurred previously, the value is incremented. At block 16, the channel selection mechanism selects either a first predetermined margin value if the incremental value does not meet or exceed a predetermined limit or selects a second predetermined margin value, wherein the second margin value is greater than the first margin value, if the incremental value does meet or exceed a predetermined limit. At block 18, channel selection mechanism compares the received signal to the reference signal plus the selected margin value. If the received signal does not meet or exceed the reference signal plus the selected margin value, channel selection is not performed. If the received signal does meet or exceed the reference signal plus the selected margin value, channel selection is performed. The channel selection mechanism may remove identification information and associated incremental values gradually or completely if an update with a stored area has not occurred for a certain amount of time.

Referring to FIG. 2, illustrated is relevant GPRS, EDGE, or UMTS architecture of a mobile communications device utilizing the channel selection mechanism denoted generally as 30. The relevant architecture 30 comprises a radio channel 32 for connecting over a radio link to a base transceiver station, a physical layer mechanism 34 for generating the radio channel 32, a link layer mechanism 36 comprising a Medium Access Control (MAC) mechanism 38, and a Radio Link Control mechanism 40 for multiplexing and de-multiplexing control and user data to and from control and user data channels, 42a and 42b, and to and from transport channels 44, and a Radio Resource Control mechanism 46 for processing control data 42a, 48 and providing control information over control channel 50. Additional architecture and description is not provided since there are many different variations of mobile communications devices that the basic architecture of which would be known to someone of skill in the art. However, the mobile communications device may comprise, depending on the service supported, additional software components, such as IP, TCP, UPD, and RTP and applications layer software, such as email, internet search engines, and schedule and calendar software, in addition to various middleware components.

RRC mechanism 46 comprises a data processing mechanism for storing and processing data according to the processes identified within the description associated with FIG. 1. The data processing mechanism comprises a processor 52, a memory 54, and a Digital Signal Processor (DSP) 56, for receiving channel information, storing and processing the channel selection information, and executing the procedures and providing the control information necessary for channel selection. In the embodiment of the invention, the RRC mechanism 46 receives signal levels from serving and adjacent base transceiver stations, network identification information, and according to this information compares signal levels of adjacent base transceiver stations to either: the reference signal in the case no RAU or LAU is required; to the reference signal plus a first margin value in the case a RAU or LAU is required and the same RAU or LAU has not occurred previously a predetermined number of times; and to the reference signal plus a second margin value, wherein the second margin value is greater than the first margin value by a predetermined amount, in the case where either the same RAU or LAU occurred previously a predetermined number of time. Although FIG. 2 illustrates data processing mechanism encompassed within the RRC mechanism, it should be understood by one skilled in the art that the data processing mechanism may be a shared resource shared by other components within the architecture.

Referring now to FIG. 3, an exemplary wireless communications network, for example a GSM, GPRS or UMTS communications network adhering to appropriate standard specifications, supporting communication services for a mobile communications device utilizing the channel selection mechanism is illustrated and denoted generally as 60. The wireless communications network 60 comprises a core network 62 coupled to Radio Access Network (RAN) 64, 66 and to other networks 68, such as Public Switched Telephone Networks (PSTN) or Packet Data Networks (PDN). The wireless communications network further comprises core network 70 coupled to RAN 72, 74 and to other networks 76, such as a PSTN or PDN, and a mobile communications device 78. RAN 64, 66, 72, and 74 comprises multiples base transceiver stations providing a radio interface to the mobile communications device 78 and a radio network controller for assigning radio resources and directing communications over the base transceiver stations. In this illustration, RAN 64 comprises a network controller supporting two groups of base transceiver stations identified by RA1 and RA2 and further supported by one core network 62 identified by LA1. RAN 66 comprises a network controller supporting a group of base transceiver stations identified by RA3 and further supported by core network 62, 70 and identified by LA2. RAN 72 comprises a network controller supporting a group of base transceivers stations identified by RA4 and further supported by core network 70 identified by LA3. RAN 74 comprises a network controller supporting a group of base transceiver stations identified by RA5, RA6 and further supported by core network 70 identified also by LA3.

Communications traffic is routed to and from the mobile communications device 78, to and from RAN 64, and to and from core network 62, and other network 68 according to the RA and LA. As an example, in this particular illustration the mobile communications device 79 may be assigned LA1, RA1. Although not illustrated, in practice cell coverage between RAN will overlap one another. When mobile communications device 78 receives signal levels indicating that a transition between base transceiver stations should occur, the channel selection mechanism as described with reference to FIGS. 1 and 2 determine if channel selection would result in a RAU or LAU. If an update would occur, for example if channel selection would result in mobile station having LA1, RA2, the reference signal level of a serving base transceiver station plus a margin value is used to compare against the signal level of an adjacent base transceiver station if an update between RA1 and RA2 occurred previously a predetermined number of times. Therefore, channel selection history may be used to mitigate excessive network updates due to a combination of position and propagation characteristics.

While the use and implementation of particular embodiments of the present invention are presented in detail below, it will be understood that the present invention provides many inventive concepts, which can be embodied in a wide variety of contexts. The specific embodiments discussed herein are mere illustrations of specific ways for making and using the invention and are not intended to limit the scope of the invention.

I claim:

1. A method for selecting a base transceiver station from a plurality of available base transceiver stations, comprising:
   identifying an incremental value associated with an adjacent base transceiver station, reflecting a quantity of prior network area updates;
   selecting, from a plurality of available margin values, a selected margin value according to the incremental value associated with the adjacent base transceiver station;
   acquiring, from the adjacent base transceiver station, an adjacent signal having an adjacent signal level;
   acquiring, from the serving base transceiver station, a reference signal having a reference signal level; and
   selecting a communications channel with the adjacent base transceiver station and incrementing the incremental value whenever the adjacent signal level exceeds the reference signal level plus the selected margin value.

2. The method for selecting a base transceiver station as recited in claim 1 wherein the adjacent signal level reflects the strength of a signal received from the adjacent base transceiver station.

3. The method for selecting a base transceiver station as recited in claim 1 wherein the reference signal level reflects the strength of a signal received from the serving base transceiver station.

4. The method for selecting a base transceiver station as recited in claim 1 wherein there are exactly two margin values in the plurality of available margin values.

5. The method for selecting a base transceiver station as recited in claim 1 wherein at least one of the plurality of available margin values is zero.

6. A mobile communications device comprising:
   a memory for storing network identification information and associated incremental values; and
   a processor configured to:
   identify an incremental value associated with an adjacent base transceiver station, reflecting a quantity of prior network area updates;
   select, from a plurality of available margin values, a selected margin value according to the incremental value associated with the adjacent base transceiver station;
   acquire, from the adjacent base transceiver station, an adjacent signal having an adjacent signal level;
   acquire, from a serving base transceiver station, a reference signal having a reference signal level; and
   select a communications channel with the adjacent base transceiver station and increment the incremental value whenever the value of the adjacent signal level exceeds the sum of the reference signal level and the selected margin value.

7. The mobile communications device as recited in claim 6 wherein the adjacent signal level reflects the strength of a signal received from the adjacent base transceiver station.

8. The mobile communications device as recited in claim 6 wherein the reference signal level reflects the strength of a signal received from the serving base transceiver station.

9. The mobile communications device as recited in claim 6 wherein there are exactly two margin values in the plurality of available margin values.

10. The mobile communications device as recited in claim 6 wherein at least one of the plurality of available margin values is zero.

11. A mobile communications device comprising:
   means for identifying an incremental value associated with an adjacent base transceiver station reflecting a quantity of prior network area updates;
   means for selecting, from a plurality of available margin values, a selected margin value according to the incremental value associated with the adjacent base transceiver station;
   means for acquiring, from the adjacent base transceiver station, an adjacent signal having an adjacent signal level;
   means for acquiring, from the serving base transceiver station, a reference signal having a reference signal level; and
   means for selecting a communications channel with the adjacent base transceiver station and incrementing the incremental value whenever the adjacent signal level exceeds the reference signal level plus the selected margin value.

12. The mobile communications device as recited in claim 11 wherein the adjacent signal level reflects the strength of a signal received from the adjacent base transceiver station.

13. The mobile communications device as recited in claim 11 wherein the reference signal level reflects the strength of a signal received from the serving base transceiver station.

14. The mobile communications device as recited in claim 11 wherein there are exactly two margin values in the plurality of available margin values.

15. The mobile communications device as recited in claim 11 wherein at least one of the plurality of available margin values is zero.

* * * * *